April 23, 1963     N. J. SMITH     3,086,494
PRECISION DIAL ASSEMBLY FOR GAUGES
Filed May 5, 1961
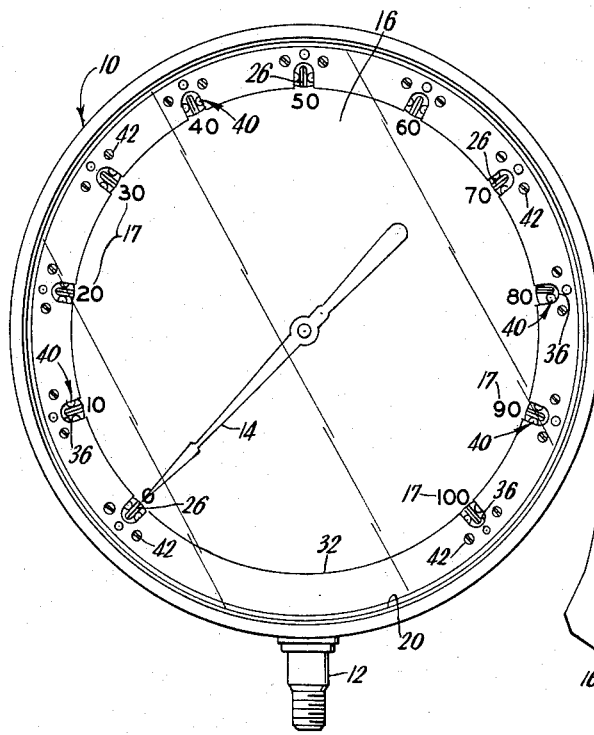
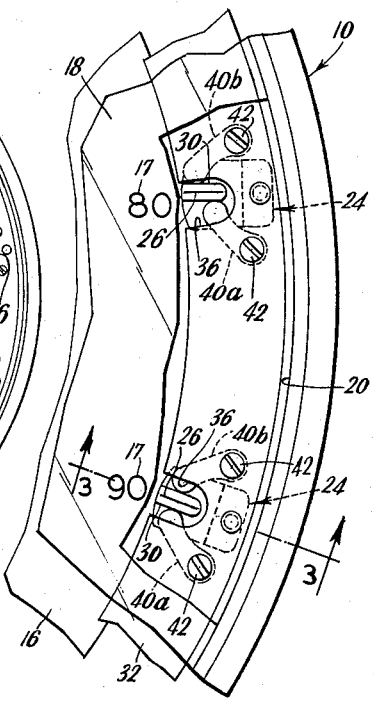
INVENTOR:
NORMAN J. SMITH
BY Howson & Howson
ATTYS.

United States Patent Office 3,086,494
Patented Apr. 23, 1963

3,086,494
PRECISION DIAL ASSEMBLY FOR GAUGES
Norman J. Smith, Churchville, Pa., assignor to J. E. Lonergan Company, Philadelphia, Pa., a corporation of Pennsylvania
Filed May 5, 1961, Ser. No. 108,184
6 Claims. (Cl. 116—129)

This invention relates to measuring instruments of the type having an indicator and a graduated dial which are movable relative to one another to indicate a variable condition, for example fluid pressure, temperature or the like. The present invention is directed more particularly to an improved dial assembly having novel features whereby the dial may be adjusted selectively as required to give precise readings of the variable being measured.

In some measuring instruments, for example, pressure gauges, the indicator is connected to a gauge movement such as a Bourdon tube and moves with respect to a graduated dial plate in response to pressure impulses sensed by the Bourdon tube to indicate pressure variations. Since the characteristics of similarly constructed gauges generally vary it is necessary to calibrate each gauge and since gauge characteristics for a particular gauge change over a period of normal use, it is essential to recalibrate the gauge in order to obtain accurate readings. One of the methods for calibrating and/or recalibrating gauges of this type was to adjust some of the parts of the gauge movement which required disassembly of the gauge. Another alternative was to remove and replace the dial plate with a new one when required by a change in gauge characteristics which also necessitated gauge disassembly. It is readily apparent that replacement or adjustment of gauge parts is tedious, time-consuming and expensive.

With the foregoing in mind, an object of the present invention is to provide a novel and effective means for calibrating gauges whereby the gauge may be calibrated quickly and accurately without disassembling the gauge or replacing any parts.

Another object of the present invention is to provide a dial assembly for measuring instruments having novel features whereby the dial may be adjusted selectively as required to compensate for variations in the gauge characteristics.

A further object of the present invention is to provide an adjustable dial assembly suitable for use with various types of commercially known measuring instruments whereby calibration of the gauge is simplified and precise readings are assured.

A still further object of the present invention is to provide an adjustable dial assembly for measuring instruments which is of simplified construction, is economical to manufacture and provides extreme accuracy.

These and other objects of the present invention and the various features and details of the construction and operation thereof are more fully set forth hereinafter with reference to the accompanying drawings in which:

FIG. 1 is a front elevational view of a measuring instrument embodying a dial assembly in accordance with the present invention;

FIG. 2 is an enlarged fragmentary view showing some of the details of the dial assembly;

FIG. 3 is an enlarged sectional view taken on line 3—3 of FIG. 2;

FIG. 4 is a further enlarged sectional view taken on line 4—4 of FIG. 3; and

FIG. 5 is a perspective view of the indexing mechanism of the dial assembly of the present invention.

Referring now to the drawing, FIG. 1 shows a pressure gauge of generally conventional form embodying the dial assembly of the present invention. The gauge includes a generally cylindrical housing 10 having a tubular stem 12 depending therefrom through which variations in fluid pressure are transmitted to a gauge movement (not shown) and a pointer or indicating needle 14 connected to the gauge movement operable to sweep over a graduated dial plate 16 in response to impulses from the gauge movement to indicate pressure variations. In the present instance the dial plate 16 is of generally disk-like form having indicia 17 thereon circumferentially spaced apart adjacent the outer edge of the front face of the dial plate 16. The indicia, which increase in increments of 10 p.s.i. from 0 to 100 clockwise around the face of the plate constitute the major scale graduations. As shown in FIG. 3, the indicating needle 14 and dial plate 16 are protected from the surrounding atmosphere by a dial cover plate 18 mounted on the forward part of the housing by a retaining ring 20 and a gasket 22.

In accordance with the present invention means is provided for calibrating the gauge to give precise readings of the pressure being measured. This means includes a plurality of indexing tabs 24 pivotally mounted at spaced apart locations on the dial, in the present instance one tab being located at each of the major graduations of the dial. Each tab 24 has a hairline 26 thereon providing an index with which the indicating needle cooperates to give a pressure reading. As shown each of the tabs 24 has an elongated elevated rib 30 providing an abutment at its outer end remote from the pivotal connection which is engageable to rotate the tab and change the position of the index with respect to other indices and the dial plate. In the present instance, each of the tabs 24 is pivotally mounted at its inner end on an annular dial ring 32 which is disposed concentrically of the dial plate 16 and is spaced forwardly thereof as shown in FIG. 3. The inner peripheral edge of the dial ring 32 terminates adjacent the outer edge of the dial plate radially outwardly of the indicia 17 so that they may be seen readily. A plurality of circumferentially spaced arcuate cut-out portions 36 is provided in the dial ring 32 extending generally radially from the inner edge of the ring, each cut-out being approximately aligned with one of the major scale graduations. One indexing tab 24 is pivotally mounted on the undersurface of the ring 32 at each of the cut-out portions with the elevated rib 30 thereof projecting into the cut-out portion 36.

Means is provided to rotate the indexing tab 24 about its pivotal connection to adjust selectively the index with respect to other indices and the dial. To this end, at least one elongated adjusting finger 40 is pivotally mounted at one end on the dial ring 32 with its free outer end adapted to engage the rib 30 of the indexing tab and to rotate the tab upon actuation of the finger. In the present instance, a cooperating pair of adjusting fingers 40a and 40b is provided for each of the indexing tabs 24, the fingers of each pair adapted to engage opposite sides of the elevated rib 30 as shown in FIG. 5. A stud 42 having a slotted head mounts each of the adjusting fingers 40 on the underside of the dial ring 32 so that a screwdriver or the like may be used to rotate the stud and thereby actuate the adjusting finger. With respect to FIG. 2, it may be seen that rotation of the finger 40a in a clockwise direction effects rotation of the index tab 24 in a similar clockwise direction. Conversely rotation of the adjusting finger 40b in a counterclockwise direction effects movement of the index tab 24 in a counterclockwise direction. It is noted that since the fingers 40a and 40b engage the abutment of the tab at a point remote from its pivotal connection, it is possible to effect very fine adjustment of the indexing tab and thereby set the gauge for very precise readings.

The gauge is calibrated by subjecting it to measured quantities of pressure and adjusting the index tabs at the major graduations so that the hairline 26 registers with the indicating needle 14 when the pressure being measured is equal to the indicated pressure. Accordingly with no pressure on the gauge, the index tab at the zero graduation is moved as required by manipulating the adjusting fingers 40a and 40b until the hairline is in registry with the needle 14. Pressure fluid, at an accurate measured pressure of 10 p.s.i. is then admitted through the stem 12 to move the pointer 14 to a position corresponding to the measured pressure. The indexing tab 24 at the major scale reading 10 is then adjusted by means of the adjusting fingers 40a and 40b so that the pointer registers with the hairline on the tab. The measured pressure is then increased in increments of 10 p.s.i. for the remaining calibrations, and the indexing tabs at the major graduations are adjusted in the manner described above. It is noted that since the gauge does not require disassembly, the time consumed for calibrating the gauge is greatly reduced and that as the gauge characteristics change during normal use thereof, it may be recalibrated easily without replacing or disassembling parts of the gauge.

While a particular embodiment of the present invention has been illustrated and described herein, it is to be understood that changes and modifications may be incorporated within the scope of the following claims.

I claim:

1. In an instrument for measuring a variable condition including cooperating indicator and dial members movable relative to one another to give a reading of the condition being measured, means for calibrating said instrument to give precise readings of said condition being measured comprising, at least two tabs pivotally mounted at spaced apart locations on said dial, each of said tabs having an elongated rib providing an abutment, and an index on said rib with which the indicator closely cooperates, said rib being engageable at a point remote from said pivotal connection to rotate said tab and change the position of said index with respect to other indices and said dial.

2. In an instrument for measuring a variable condition including cooperating indicator and dial members movable relative to one another to give a reading of the condition being measured, means for calibrating said instrument to give precise readings of said condition being measured comprising, an annular member mounted in said instrument and spaced from said dial member, means defining at least two spaced apart cut-out portions in said annular member, a tab pivotally mounted on said annular member at each of said cut-out portions intermediate said dial member and said annular member, said tab having an elongated rib and an index thereon with which said indicator closely cooperates, said rib providing an abutment remote from said pivotal connection which is engageable to actuate said tab and change the position of said index with respect to other indices and said dial.

3. In an instrument for measuring a variable condition including a dial plate of disk-like form having a plurality of circumferentially spaced indicia thereon providing major graduations and an indicator movable relative to said dial and said indicia to give a reading of the condition being measured, means for calibrating said instrument to give precise readings of the condition being measured comprising, an annular dial ring mounted in said instrument and spaced from said dial plate concentrically therewith, means defining a plurality of cut-out portions on the inner peripheral edge of said ring radially aligned with and corresponding in number to the major graduations on said dial plate, a tab pivotally mounted on said dial ring intermediate said dial plate and said ring at each of said cut-out portions, each of said tabs having an elongated rib providing an abutment which projects into said cut-out portions and a radial index thereon with which said indicator closely cooperates, said abutment being remote from said pivotal connection of said tab and engageable to rotate said tab to change the position of said index with respect to other indices and said dial plate.

4. In an instrument for measuring a variable condition including cooperating indicator and dial members movable relative to one another to give a reading of the condition being measured, means for calibrating said instrument to give precise readings of the condition being measured comprising at least two tabs pivotally mounted at spaced apart locations on said dial, each of said tabs having an index thereon with which the indicator closely cooperates, means providing an abutment on each of said tabs remote from said pivotal connection, and an adjusting finger pivotally mounted in said instrument and engageable with said abutment to rotate said tab and change the position of said index with respect to other indices and said dial.

5. In an instrument for measuring a variable condition including cooperating indicator and dial members movable relative to one another to give a reading of the condition being measured, means for calibrating said instrument to give precise readings of the condition being measured comprising, at least two tabs pivotally mounted at spaced apart locations on said dial, each having an index thereon with which the indicator closely cooperates, means providing an abutment on each of said tabs remote from said pivotal connection, a pair of cooperating adjusting fingers for each of said tabs pivotally mounted adjacent thereto and operable to engage said abutment to pivot said tab and change the position of said index with respect to other indices and said dial, one of said adjusting fingers operable to engage one side of said abutment to pivot said tab in one direction and the other of said adjusting fingers operable to engage the other side of said abutment and pivot said tab in an opposite direction.

6. In an instrument for measuring a variable condition including cooperating indicator and dial members movable relative to one another to give a reading of the condition being measured, means for calibrating said instrument to give precise readings of the condition being measured comprising, at least two tabs pivotally mounted at spaced apart locations adjacent the peripheral edge of said dial member, each of said tabs having an elongated rib providing an abutment adjacent the end thereof remote from said pivotal connection thereof, and an index on said rib with which the indicator closely cooperates extending in a radial direction relative to said pivotal connection, said rib being engageable at a point remote from said pivotal connection to rotate said tab and change the position of said index with respect to other indices and said dial.

References Cited in the file of this patent

UNITED STATES PATENTS 2,999,478    Du Bois _____ Sept. 12, 1961